Aug. 4, 1964　　　F. E. BECKER　　　3,143,640
SHEET-TYPE HEATER AND OVERHEAT PROTECTION DEVICE
Filed Oct. 3, 1961　　　　　　　　　　　2 Sheets-Sheet 1
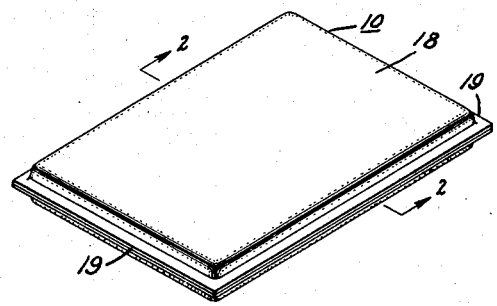
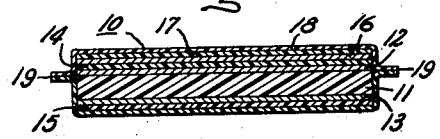
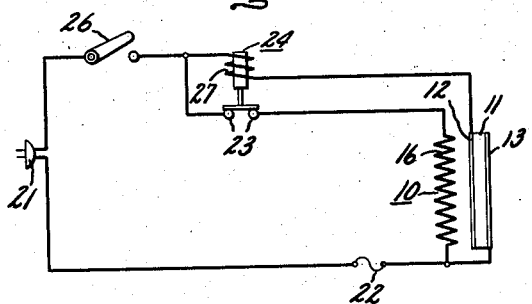
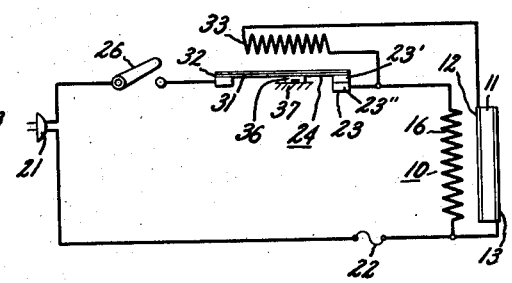
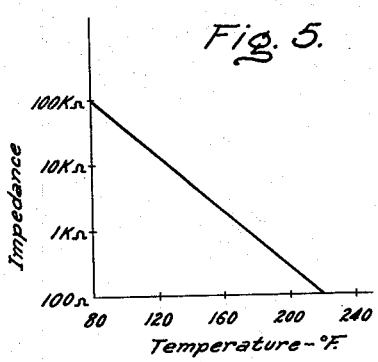
Inventor:
Frank E. Becker,
by Laurence R. Kempton
His Attorney.

Aug. 4, 1964     F. E. BECKER     3,143,640
SHEET-TYPE HEATER AND OVERHEAT PROTECTION DEVICE
Filed Oct. 3, 1961     2 Sheets-Sheet 2
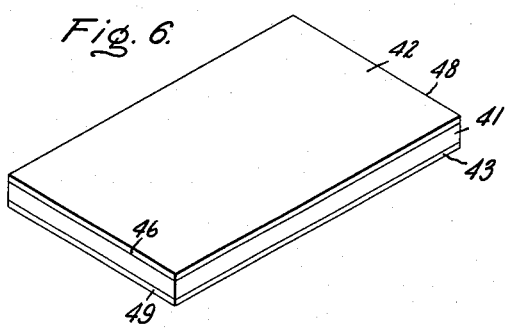
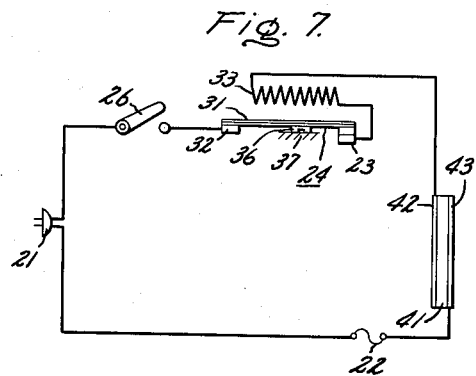
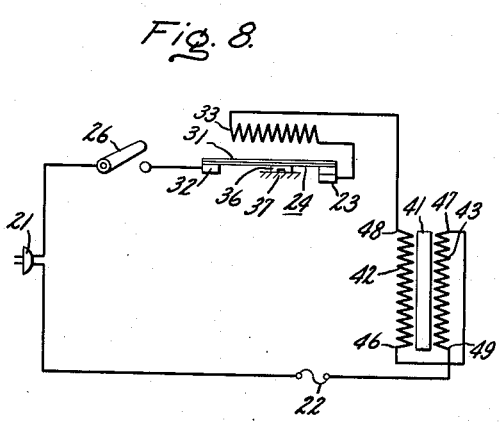
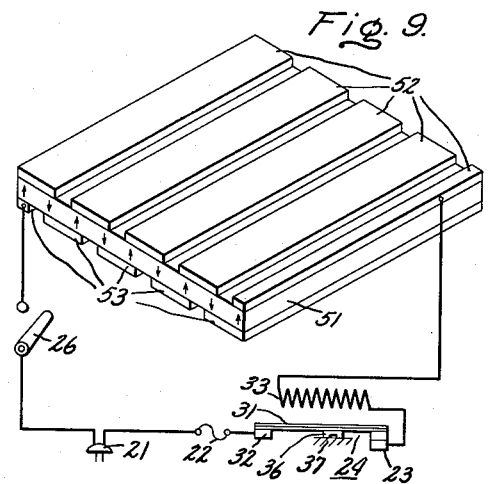
Inventor:
Frank E. Becker,
by Laurence R. Kempton
His Attorney.

United States Patent Office 3,143,640
Patented Aug. 4, 1964

3,143,640
SHEET-TYPE HEATER AND OVERHEAT
PROTECTION DEVICE
Frank E. Becker, Lexington, Ky., assignor to General
Electric Company, a corporation of New York
Filed Oct. 3, 1961, Ser. No. 142,615
4 Claims. (Cl. 219—494)

This invention relates to sheet-like heating devices, such as heating pads and electric blankets, and particularly relates to such devices which incorporate means for automatically turning off the heating power in the event of an overheated condition.

Sheet-like heating devices, such as heating pads and electric blankets, in order to be safe, customarily employ an overheat protection arrangement for turning themselves off automatically in the event that they become unduly warm. There are various reasons why such a device may overheat or become unduly warm, such as a defect in the electrical heating system, or due to the device becoming unduly folded or crumpled. Such an overheat, though generally confined to a relatively small area, can be dangerous if allowed to continue. One type of overheat protective arrangement comprises one or more thermostatic switch elements arranged in the heating device and connected in series with the heater wire or element, so that if an overheat occurs in the vicinity of a thermostatic switch element, this element will open the electrical circuit and thereby prevent the overheat condition from continuing. Such an arrangement is described in U.S. Patent 2,195,947 to H. W. Uhlrig, assigned to the same assignee as the present invention. Another type of overheat protection arrangement makes use of the change in resistance of a wire due to a temperature change. This wire is distributed in the heating device, and means are arranged to turn off the power automatically if the resistance of the wire changes to an extent indicating an overheat. Another type of overheat protective arrangement provides a heater wire surrounded with a temperature-sensitive material possessing the characteristic of having an impedance that varies with changes in temperature, and this temperature-sensitive material is wrapped with a control conductor. Suitable circuits are connected between the control conductor and heater wire for shutting off the power in the event that the impedance of the temperature-sensitive material changes to a value that indicates an overheat condition. Such an arrangement is described in U.S. Patent 2,581,212 to D. C. Spooner et al., assigned to the same assignee as the present invention. A further type of overheat protective arrangement, described in U.S. Patent 2,846,560, which is assigned to the same assignee as the present invention, consists of a heater conductor and a control conductor embedded in a thermosensitive composition having a negative temperature-resistance coefficient.

The prior art overheat protective arrangements, including those described above, are responsive only to overheats that occur at, or in the immediate vicinity of, certain wires or thermostats, and thus these prior arrangements do not give overheat protection over the entire area of a sheet-like heating device.

An object of the present invention is to provide a sheet-like heating device providing overheat protection over the entire area thereof.

Other objects are to provide a sheet-like heating device and overheat protection arrangement that is reliable, relatively thin, and economical to manufacture.

In the drawing:

FIG. 1 is a perspective view of a preferred embodiment of the invention;

FIG. 2 is a cross-sectional view taken on the line 2—2 of FIG. 1;

FIGS. 3 and 4 show alternative electrical circuits connected with the devices shown in FIGS. 1 and 2;

FIG. 5 is a graph showing the impedance versus temperature characteristic of a material used in the device of FIGS. 1 through 4;

FIG. 6 is a perspective view of an alternative embodiment of the invention;

FIGS. 7 and 8 are electrical diagrams of alternative circuits used with the embodiment of the invention shown in FIG. 6; and FIG. 9 is a perspective view of a further alternative embodiment of the invention, and also shows a suitable circuit arrangement connected thereto.

The invention comprises, basically, a sheet of thermosensitive material having a negative temperature-resistance coefficient, with one or more electrodes being placed on each side of this sheet, an electrical heating circuit arranged to impart heat to the sheet of thermosensitive material, and an overheat switch device having contacts in the heating circuit and having an actuating means connected in a series path including an electrode on each side of the sheet of thermosensitive material and the portion of the thermosensitive material lying therebetween.

Now referring to FIGS. 1 and 2, there is shown, in accordance with the invention, a preferred embodiment of a heating device 10 incorporating a sheet-type heater and an overheat protection device, comprising a sheet 11 of thermosensitive material, and sheet-like electrically conductive electrodes 12, 13 positioned against the two sides of the thermosensitive sheet 11. Layers 14, 15 of electrically insulative material, such as Mylar, are positioned over the outer surfaces of electrodes 12, 13. An electrical heating element 16, of sheet-like form, is positioned over the outer surface of the insulation 14, and a layer 17 of electrical insulation is arranged to cover the outer surface of the heating element 16. The arrangement may be encased in a cover 18, which may be made of a plastic material such as polyvinyl chloride and may be sealed together at its edges 19.

The sheet 11 of thermosensitive material preferably is a composition that is flexible. A preferred thermosensitive material is composed of an insulating composition such as polyvinyl chloride with the addition of a small amount of certain ionic materials classified as surface active agents or ion exchange resins. Such materials are fully disclosed in U.S. Patent 2,846,560 to J. F. Jacoby et al., assigned to the assignee of the present invention. Stearyldimethylbenzyl ammonium chloride is the preferred active agent, and polyvinyl chloride is the preferred insulating composition. By way of example, FIG. 5 shows a curve of the impedance versus temperature characteristic, measured through the thickness of a sheet of material 10 inches by 14 inches by .001 inch thick, composed of vinyl containing 5 percent of an ionic material.

The electrodes 12, 13 may be formed by metalizing the surfaces of the thermosensitive material 11, or these electrodes may be metallic foils placed against the surfaces of the thermosensitive material 11. The heater 16 may be any suitable sheet-like type of heater, such as a resistive material composed of a thin vinyl sheet loaded with carbon black, or it may be a thin metallic sheet having suitable resistance characteristics for producing heat when current is passed therethrough. Alternatively, the heater 16 may comprise one or more heater wires arranged in a suitable configuration. The resulting article is a relatively thin and flexible device.

Now referring to FIG. 3, the heating device 10 is connected in an electrical circuit in such a manner that the heating element 16 is connected to the terminals of a power line connector 21 in a series circuit comprising a fuse 22, contacts 23 of a relay 24, and a switch device 26.

The switch device 26 may, if desired, include an arrangement for automatically cycling the power on and off at a rate determined by the ambient room temperature, as is described in the above-mentioned Patent 2,195,947. The electrode 13 is connected to one side of the power line at the lower end of the heater element 16 in the schematic diagram. The other electrode 12 is connected, via a winding 27 of the relay 24, to the other side of the power line at a point between the switch device 26 and the relay contacts 23. The relay 24 is normally "on," and functions to open the contacts 23 in the event that the current in the winding 27 exceeds a certain value.

The circuit of FIG. 3 operates as follows. When power is applied to the connector 21, and with the switch 26 closed, current flows through the sheet-like heating element 16, thereby causing the heating device 10 to become warm. As pointed out above, the switch device 26 may incorporate means for automatically turning the heating power on and off at a cycling rate dependent upon ambient temperature, so that the heating device will be made warmer when the ambient temperature is relatively cooler and vice versa. In the event that an overheat should occur at any point or localized area, or over the entire area, of the sheet-like heating element 16, the heating power will automatically be turned off, as follows. During normal operation of the arrangement, the resistance of the thermosensitive material 11 is such that any current which flows therethrough between the electrodes 12 and 13, will be of an insufficient value to actuate the relay 24. However, in the event of an overheat at any point over the surface of the heating unit, the resistance of the thermosensitive material 11 will, in the region of overheat, decrease in value, since the thermosensitive material has a negative temperature-resistance coefficient. This reduction of resistance, wherever it may occur in the sheet 11 of thermosensitive material, will cause the current in the relay winding 27 to increase to a value sufficient to actuate the relay 24, thereby opening the contacts 23 and removing power from the heating element 16. Thus, any danger of fire, a scorch, or other damage due to the overheat, is automatically eliminated. The relay 24 may be constructed so that it will lock out in the event of an overheat, or it may be constructed so that, after the circuit has been turned off for a long enough time for the overheat area to cool down, the relay 24 will drop out and re-establish the circuit at the contacts 23. Thus, the heating device 10 can continue to function, but the protective relay 24 will pull in and drop out as necessary to prevent the overheat conditions from causing damage The circuit of FIG. 4 is similar to that of FIG. 3, except that the relay 24 is of a bimetal type comprising a strip 31 of two different metals having different coefficients of expansion with respect to temperature, and arranged side by side so that the strip will bend due to temperature change. The strip 31 is fixedly positioned at an end 32 thereof, and carries a contact 23' at the other end thereof which cooperates with a fixed contact 23", thus forming the actuating contacts 23, which are connected between the switch device 26 and the heater element 16. A heater 33 is positioned near the bimetal strip 31, and is connected between the contact 23" and the electrode 12. This circuit functions as follows. In the event that an overheat should occur at any region, or over the entire area, of the sheet-like heater element 16, the corresponding area of the thermosensitive material 11 will become sufficiently warm so that the resistance in this area will decrease to a value whereby sufficient current can flow through this region, between the electrodes 12 and 13, so that the heater 33 imparts a sufficient amount of heat to the bimetal strip 31, whereby the strip 31 deflects and causes the contacts 23 to open, thereby removing the electrical power from the sheet-like heater element 16. A small permanent magnet 36 may be attached to the bimetal strip 31, and cooperates with a fixed armature 37 so as to cause the contacts 23 to open quickly and close quickly, thereby reducing the amount of arcing at the contacts 23. When the bimetal relay contacts 23 are open, heating power is removed from the heater 33, whereupon the bimetal strip 31 will cool and bend in a direction to re-establish electrical connection at the contacts 23. So long as the overheat condition exists in the heater element 16, the bimetal relay 24 will open and close at a cyclic rate, thereby permitting the heating device 10 to continue functioning, but preventing damage from occurring due to the overheat condition. If desired, the bimetal relay may be constructed to remain in the "open" condition, when actuated, until it is reset.

In the embodiment shown in FIG. 6 a sheet-like member 41 of thermosensitive material such as has been described above, is provided with electrodes 42, 43 on the two surfaces thereof. Preferably, these electrodes 42 and 43 are comprised of metal film that is deposited on the surfaces of the member 41, thus providing a relatively thin and flexible assembly. The assembly of FIG. 6 may, if desired, be encased in a covering such as the cover 18 shown in FIGS. 1 and 2. The device of FIG. 6 may be connected in an electrical circuit as shown in FIG. 7, in which the electrodes 42 and 43 are connected to a two-wire power connector 21, in series with a safety fuse 22, a relay 24, and a switch device 26. The relay 24 may be a bimetal type of relay, as has been described above in connection with FIG. 4.

The arrangement of FIG. 7 functions as follows. With power applied to the connector 21, and with the switch device 26 in closed position, current will flow through the normally closed contacts 23 of the relay 24, and through the thermosensitive material 41 between the electrodes 42 and 43. The resistivity of the thermosensitive material 41, and the thickness of the sheet 41 of thermosensitive material, are mutually chosen so that the sheet 41 of thermosensitive material has a resistance through the thickness thereof, and between the electrodes 42 and 43, so that in normal operation a proper value of current will flow therethrough to provide a desired amount of heating, this heating being produced by the power loss caused by current flow through the resistance of the sheet 41 of thermosensitive material. As described above, the switch device 26 may be arranged to turn the power on and off at a cyclical rate, depending upon the ambient temperature. In the event that an overheat should occur, the relay 24 functions to automatically remove power from the heating device. The relay 24, by way of example, may comprise a bimetal type of relay having a heater 33 connected in series with the circuit of the contacts 23 and the electrodes 42, 43.

In the event of overheating of the sheet 41 of thermosensitive material, or of a portion thereof, the resistance thereof will decrease, thereby increasing the current flow in the heater 33 and thus causing the bimetal strip 31 to deflect and open the electrical contacts 23, thereby removing power. After a time, the bimetal strip 31 will cool sufficiently to reclose the contacts 23, and current will again be applied through the sheet 41 of thermosensitive material. If the overheat condition continues in the member 41, the relay 24 will automatically recycle at a rate that will prevent any damage from occurring due to the overheat condition. If desired, the relay 24 may be provided with a lock-out device so that, when it is actuated, it must be manually reset in order to reclose the contacts 23.

FIG. 8 is a circuit diagram utilizing a heating device of the form shown in FIG. 6, in which the electrodes 42 and 43 comprise electrical resistance material and serve as heating elements in addition to serving as electrodes across the sheet 41 of thermosensitive material. For this purpose, the electrodes 42 and 43 may comprise thin layers of metal, such as aluminum that has been deposited onto the surfaces of the sheet 41. Alternatively, the electrodes 42 and 43 may be made from flexible plastic material, such as vinyl, loaded with carbon black to provide the desired resistivity. As shown in FIG. 8, an end 46 of electrode 42 is electrically connected to the opposite end 47 of the electrode 43, and the remaining ends 48, 49 of these electrodes are connected to an electrical circuit which is the same as that shown in FIG. 7. The arrangement of FIG. 8 functions as follows. With power applied to the connector 21, and with the switch 26 closed, current will flow through the normally closed contacts 23 and through both electrodes 42, 43 in a series arrangement. Due to the electrically resistive nature of the electrodes 42 and 43, these electrodes will become heated due to the current passing therethrough, thereby providing warmth for a heating pad or blanket or the like. If desired, the resistivity of the electrodes 42 and 43 may be increased by shaping them in a zig-zag manner over the surfaces of the thermosensitive material 41.

In normal operation, the amount of current flowing through the bimetal relay heater 33 will be insufficient to cause the bimetal strip 31 to deflect and open the contacts 23, and in normal operation relatively little current flows through the thermosensitive material 41 between the electrodes 42 and 43. If, however, an overheat condition should occur, the region of the thermosensitive material 41 at the overheat will exhibit a decrease in resistance, whereby current will flow through this region of the thermosensitive material 41 between the electrodes 42 and 43, thereby increasing the amount of current flowing through the heater 33, and thus causing the bimetal strip 31 to deflect and cause the contacts 23 to open. As has been described above, the bimetal relay 24 will open and close the electrical circuit as required in order to prevent the overheat condition from building up to a dangerous condition.

With the electrodes 42 and 43 connected in series as shown in FIG. 8, approximately one-half the line voltage will appear between any corresponding points of the electrodes 42 and 43, and this voltage will be sufficient to cause additional current to flow through an overheated portion of the thermosensitive material 41, thereby to actuate the protective relay 24.

Now referring to FIG. 9, an alternative embodiment of the invention is shown in connection with a suitable electrical circuit. A sheet 51 of thermosensitive material is provided with a first plurality of electrodes 52 arranged in a parallel manner on one surface thereof, and with a second plurality of electrodes 53 arranged in a parallel manner on the other surface thereof. All of the electrodes 52, 53 are parallel with respect to one another, and the two sets of electrodes are offset with respect to each other so that the electrodes 52 are respectively centered over the spaces between the electrodes 53, and the electrodes 53 are respectively centered over the spaces between the electrodes 52. The electrical circuit connections are made to an electrode 52 at one end of the device, and to an electrode 53 at the other end of the device. The electrical circuit is the same as shown in FIG. 8.

The arrangement of FIG. 9 functions as follows. In normal operation, current flows through the thermosensitive material 51 as indicated by the arrows. The current flows upwardly through the sheet 51 from the first lower electrode 53 to the first upper electrode 52, then downwardly from the latter electrode to the second lower electrode 53, and so forth. In the event that alternating current is employed, the directions of the arrow shown in FIG. 9 are representative at a given instant, and will have reversed directions at other instants.

The sheet-type heater shown in FIG. 9 comprises, in effect, several sheet-like heaters connected in electrical series. In the event of an overheat condition in any one of the series-connected elements, the resistance of that element will become reduced, due to the negative temperature-resistance coefficient of the material 51, and this decreased resistance will cause a decrease in the voltage drop across that element. This automatic reduction of resistance and voltage drop across an overheated section causes a reduction in the wattage loss of that section, and thus the overheat condition automatically tends to become eliminated. A decrease in the resistance of one or more of the series-connected heating areas will cause an increase in the current drawn by the heating device, and if this current reaches a certain predetermined value, the bimetal relay heater 33 will produce sufficient heat to deflect the bimetal strip 31 and open the electrical contacts 23. The relay 24 may be arranged to lock out upon an overheat, or it may be permitted to open and close the contacts 23 at a cycling rate that will permit the heating device to continue to function, but will prevent an overheat condition from reaching dangerous proportions.

While preferred embodiments of the invention have been shown and described, various other embodiments and modifications thereof will be apparent to those skilled in the art, but will fall within the scope of invention as defined in the following claims.

What I claim is:

1. A flexible heating device comprising a sheet-like heating element arranged to produce heat over an area, a flexible sheet of thermosensitive material having a negative temperature-resistance coefficient and arranged in parallel adjacent relationship to said area, a pair of thin sheet-like electrodes respectively positioned over the surfaces of said sheet of thermosensitive material, in electrical conducting contact with said material, electrical circuit means including a switch connected to apply current to said heating element, a current-sensitive actuator for opening said switch, and means for connecting said current-sensitive actuator to a source of current in series with said electrodes.

2. A heating device comprising a sheet of thermosensitive material having a negative temperature-resistance coefficient, a pair of electrodes respectively positioned over the surfaces of said sheet of thermosensitive material, a layer of electrical insulation placed over one of said electrodes, a thin flexible sheet-like heating element positioned over said layer of insulation, a casing of thin insulative material enclosing said thermosensitive sheet, said electrodes, and said heating element and circuit means including a current-sensitive relay having contacts connected in series with said heater element and having a current-sensitive actuator connected in series with one of said electrodes.

3. A heating device comprising a sheet of thermosensitive material having a negative temperature-resistance coefficient, a pair of flexible sheet-like electrodes respectively positioned over the surfaces of said sheet of thermosensitive material, a layer of electrical insulation positioned over one of said electrodes, a flexible sheet-like heating element positioned over said layer of insulation, and an electrical circuit including a relay device having a current-sensitive actuator connected electrically in series with said electrodes and adapted to remove electrical power from said heating element in the event that the resistance of said sheet of thermosensitive material declines to a given value.

4. The heating device recited in claim 3 wherein said thermosensitive material is a thermoplastic material having an ionic additive.

References Cited in the file of this patent

UNITED STATES PATENTS

| | | |
|---|---|---|
| 2,846,560 | Jacoby et al. | Aug. 5, 1958 |
| 2,863,033 | Wallace | Dec. 2, 1958 |
| 2,914,645 | Wallace | Nov. 24, 1959 |
| 2,969,515 | Gaugler | Jan. 24, 1961 |